(12) United States Patent
Weiland et al.

(10) Patent No.: US 10,073,225 B2
(45) Date of Patent: Sep. 11, 2018

(54) TELECOMMUNICATIONS CONNECTOR MOUNTING CLIP

(71) Applicant: The Siemon Company, Watertown, CT (US)

(72) Inventors: Timothy P. Weiland, Bantam, CT (US); Joseph M. Favale, Sr., Watertown, CT (US)

(73) Assignee: THE SIEMON COMPANY, Watertown, CT (US)

( * ) Notice: Subject to any disclaimer, the term of this patent is extended or adjusted under 35 U.S.C. 154(b) by 0 days.

(21) Appl. No.: 15/491,830

(22) Filed: Apr. 19, 2017

(65) Prior Publication Data

US 2017/0299821 A1  Oct. 19, 2017

Related U.S. Application Data

(60) Provisional application No. 62/324,456, filed on Apr. 19, 2016.

(51) Int. Cl.
*G02B 6/00* (2006.01)
*G02B 6/38* (2006.01)
*H01R 13/74* (2006.01)

(52) U.S. Cl.
CPC ......... *G02B 6/3897* (2013.01); *G02B 6/3825* (2013.01); *H01R 13/745* (2013.01)

(58) Field of Classification Search
CPC ............................ G02B 6/3825; G02B 6/3897
See application file for complete search history.

(56) References Cited

U.S. PATENT DOCUMENTS

| 3,446,467 | A | 5/1969 | Bailey et al. |
| 4,707,765 | A | 11/1987 | Ohashi |
| 5,073,042 | A | 12/1991 | Mulholland et al. |
| 5,317,663 | A | 5/1994 | Beard et al. |
| 5,359,688 | A | 10/1994 | Underwood |
| 5,418,875 | A | 5/1995 | Nakano et al. |
| 5,647,043 | A | 7/1997 | Anderson et al. |
| 6,042,428 | A | 3/2000 | Espiritu et al. |
| 6,325,335 | B1 | 12/2001 | Harvey |
| 6,363,199 | B1 * | 3/2002 | Carberry ............. G02B 6/3807 385/134 |
| 6,425,692 | B1 | 7/2002 | Fujiwara et al. |
| 6,461,054 | B1 * | 10/2002 | Iwase ................... G02B 6/3849 385/70 |
| 6,471,414 | B2 | 10/2002 | Carberry et al. |
| 7,029,322 | B2 | 4/2006 | Ernst et al. |
| 7,384,200 | B2 | 6/2008 | Nakagawa |

(Continued)

FOREIGN PATENT DOCUMENTS

| DE | 10139670 C2 | 7/2003 |
| EP | 1179745 A2 | 2/2002 |
| JP | 2004045622 A | 2/2004 |

*Primary Examiner* — Rhonda Peace
(74) *Attorney, Agent, or Firm* — Cantor Colburn LLP

(57) ABSTRACT

A mounting clip configured to secure a telecommunications connector in an opening of a plate, the telecommunications connector having a top, bottom and two sides, the mounting clip including a planar body having a portion configured to engage one side of the telecommunications connector; and at least one spring arm configured to contact the plate and apply a spring force against the plate to reduce movement of the mounting clip in the opening.

6 Claims, 18 Drawing Sheets

(56) References Cited

U.S. PATENT DOCUMENTS

| | | | | |
|---|---|---|---|---|
| 8,186,890 B2* | 5/2012 | Lu | ............................ | G02B 6/3807 |
| | | | | 385/139 |
| 8,317,409 B2* | 11/2012 | Li | ............................ | G02B 6/3821 |
| | | | | 385/53 |
| 8,632,258 B2* | 1/2014 | Jibiki | ...................... | G02B 6/3825 |
| | | | | 385/72 |
| 9,285,548 B2* | 3/2016 | Lin | ............................ | G02B 6/3825 |
| 9,297,962 B2* | 3/2016 | Lee | ............................ | G02B 6/3825 |
| 9,383,523 B2* | 7/2016 | Liu | ............................ | G02B 6/3897 |
| 9,470,849 B2* | 10/2016 | Wong | .................... | G02B 6/3644 |
| 2006/0169856 A1* | 8/2006 | Dorenkamp | ........ | G02B 6/3825 |
| | | | | 248/231.9 |
| 2010/0278497 A1* | 11/2010 | Hsu | ...................... | G02B 6/3825 |
| | | | | 385/134 |
| 2013/0101257 A1 | 4/2013 | Lin et al. | | |
| 2014/0016901 A1* | 1/2014 | Lambourn | ............ | G02B 6/3895 |
| | | | | 385/75 |

* cited by examiner

TELECOMMUNICATIONS CONNECTOR MOUNTING CLIP

CROSS-REFERENCE TO RELATED APPLICATIONS

This application claims the benefit of U.S. provisional patent application Ser. No. 62/324,456 filed Apr. 19, 2016, the entire contents of which are incorporated herein by reference.

TECHNICAL FIELD

The subject matter disclosed herein relates generally to mounting clips, and in particular to a mounting clip for telecommunication connectors, the mounting clip including an anti-rattle feature.

BACKGROUND

Existing telecommunications connectors, such as fiber adapters, often employ a metal mounting clip to mount the adapter in a plate opening. The existing mounting clips have several drawbacks. Existing mounting clips may have a rectangular frame with a mounting clip on each end. The adapter is received in an opening of the rectangular frame. This requires that a proper size mounting clip must be selected for each application. In other words, a different mounting clip is needed for one port adapters, two port adapters, four port adapters, etc. Another drawback to existing mounting clips is the lack of a snug fit between the mounting clip and a plate opening. Often, there is play between the mounting clip and the plate opening causing the adapter and mounting clip to move or rattle when mounted in the plate.

BRIEF DESCRIPTION OF THE DRAWINGS

Referring now to the drawings wherein like elements are numbered alike in the FIGURES.

DETAILED DESCRIPTION

Figure 1:
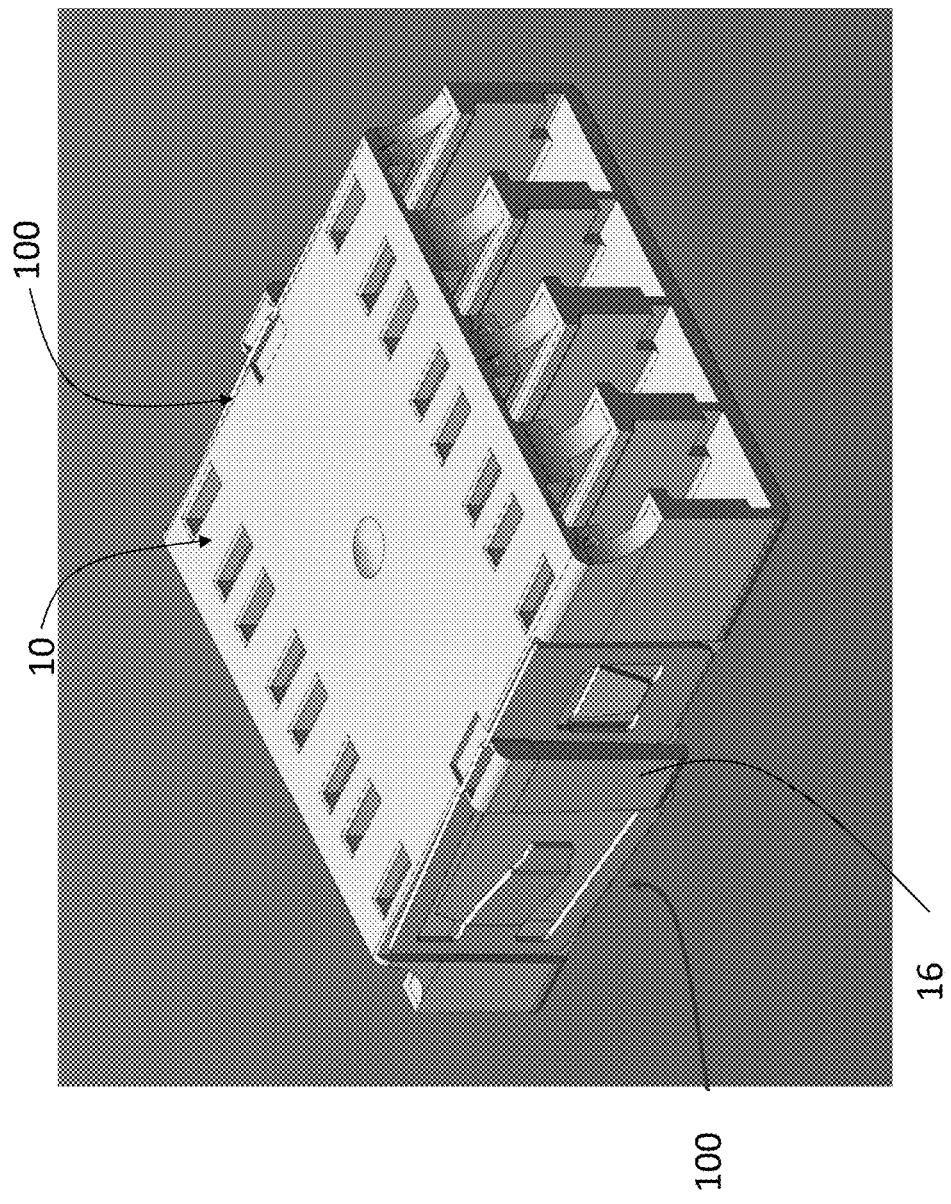
FIG. 1 is a perspective view of a telecommunications connector fitted with mounting clips in an example embodiment.

FIG. 1 is a perspective view of a telecommunications connector 10 fitted with mounting clips 100 in an example embodiment. The telecommunications connector 10 is a four port adapter for LC fiber connectors. It is understood that the mounting clips 100 may be used with a variety of telecommunications connectors of various sizes (e.g., one port, two port, four port, etc.) and types (e.g., LC, SC, MTP, copper, fiber, coaxial, etc.), and embodiments are not limited to the telecommunications connector 10 of FIG. 1. The telecommunications connector 10 has a top, bottom and two sides. Mounting clips in embodiments are secured at the sides of the telecommunications connector 10.

Figure 2:
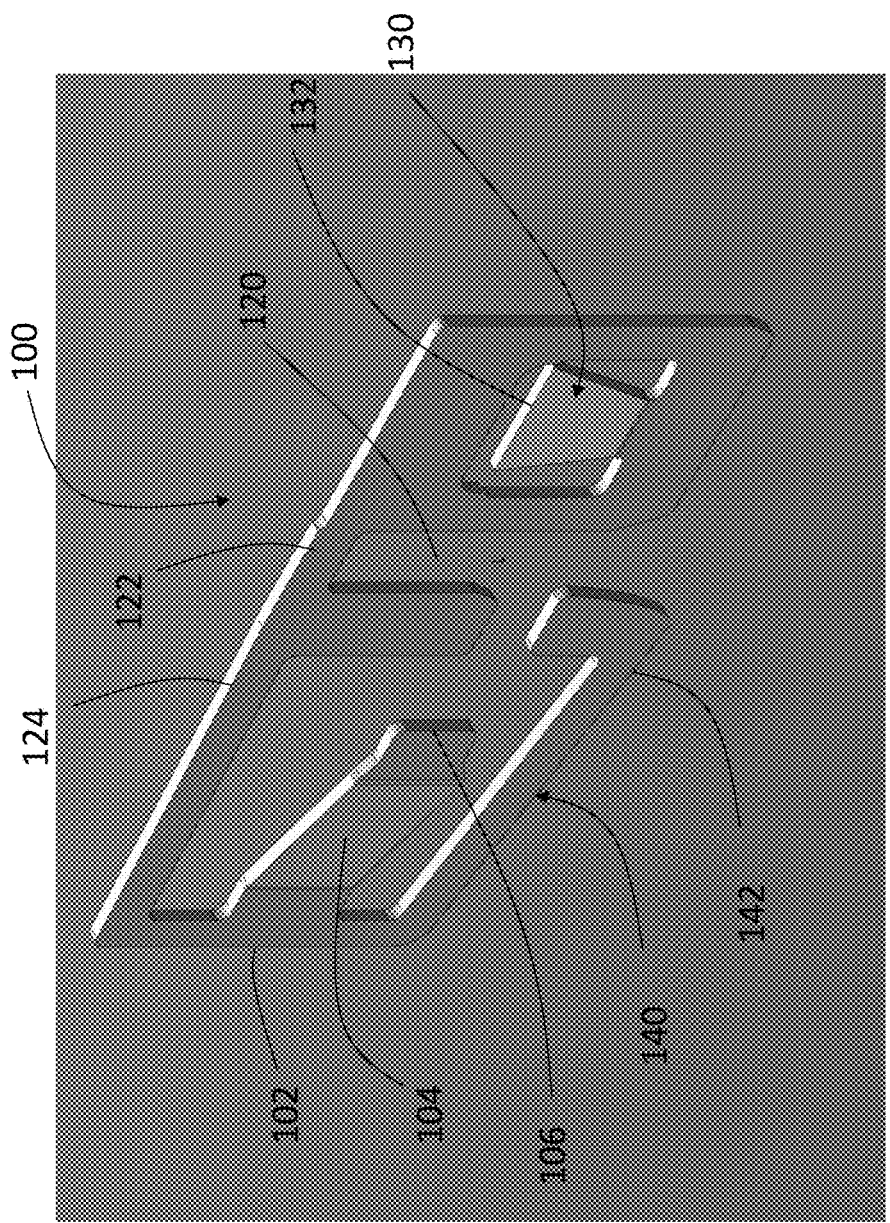
FIG. 2 is a perspective view of a mounting clip in an example embodiment.

FIG. 2 is a perspective view of a mounting clip 100 in an example embodiment. Mounting clip 100 includes a generally planar body having a mounting arm 104 that extends rearward from a front edge 102 of the mounting clip 100. The mounting arm 104 extends away from the plane of the mounting clip 100 at an acute angle. The mounting arm 104 has a distal end 106 configured to contact a front face of a mounting plate 300 (FIG. 2) to prevent horizontal travel of the telecommunications connector 10 inwards, towards the plate. A flange 16 (FIG. 1) on the telecommunications connector 10 prevents horizontal travel of the telecommunications connector 10 outwards, away from the plate. With the plate 300 sandwiched between the flange 16 and the distal end 106 of the mounting arm 104, the telecommunications connector 10 is fixed horizontally in the plate. Pressing the mounting arm 104 towards the telecommunications connector 10 defeats the mounting arm 104 and allows removal of the telecommunications connector 10 from the plate 300. Plate 300 may be part of a patch panel, adapter bracket, etc. and is used herein to generally refer to a structure to which the telecommunications connector is mounted.

The mounting clip 100 includes a slot or opening 120 that receives flange 16 of the telecommunications connector 10. The flange 16 may be a raised, rectangular section on a sidewall of the telecommunications connector 10. The flange 16 is slid into the opening 120 until the flange 16 contacts a stop 122 at one end of the opening 120. The interaction of the flange 16 and the opening 120 sets a vertical location of the mounting clip 100 on the telecommunications connector 10 and restricts vertical travel of the mounting clip 100 in a downwards direction.

Mounting clip 100 also includes a retaining clip 130 that contacts a surface of the telecommunications connector 10 to restrict motion of the mounting clip 100 relative to the telecommunications connector 10 in an upwards, vertical direction. The retaining clip 130 is bent inward from the plane of the mounting clip 100 by an acute angle. A distal end 132 of the retaining clip 130 contacts a surface of the telecommunications connector 10. In one embodiment, the distal end 132 of retaining clip 130 is located beneath an undercut 20 (FIG. 5) on the sidewall of the telecommunications connector 10.

The mounting clip 100 also includes a spring member 140 which applies a spring force to an edge of the opening in the plate 300 to prevent movement of the mounting clip 100 (and the telecommunications connector 10) relative to the plate 300, such as vibration or rattle. Spring member 140 applies a force having a vertical component to wedge the mounting clip 100 in the opening in the plate 300. The distance from a first edge 124 of mounting clip 100 to an edge 142 of the spring arm 140 that contacts the plate 300 is greater than the size of the opening in the plate. When the mounting clip 100 is inserted into the opening in the plate 300, spring arm 140 is compressed, which applies a spring force driving the mounting clip 100 against the plate 300. This spring force provides an anti-rattle function.

Figure 3:
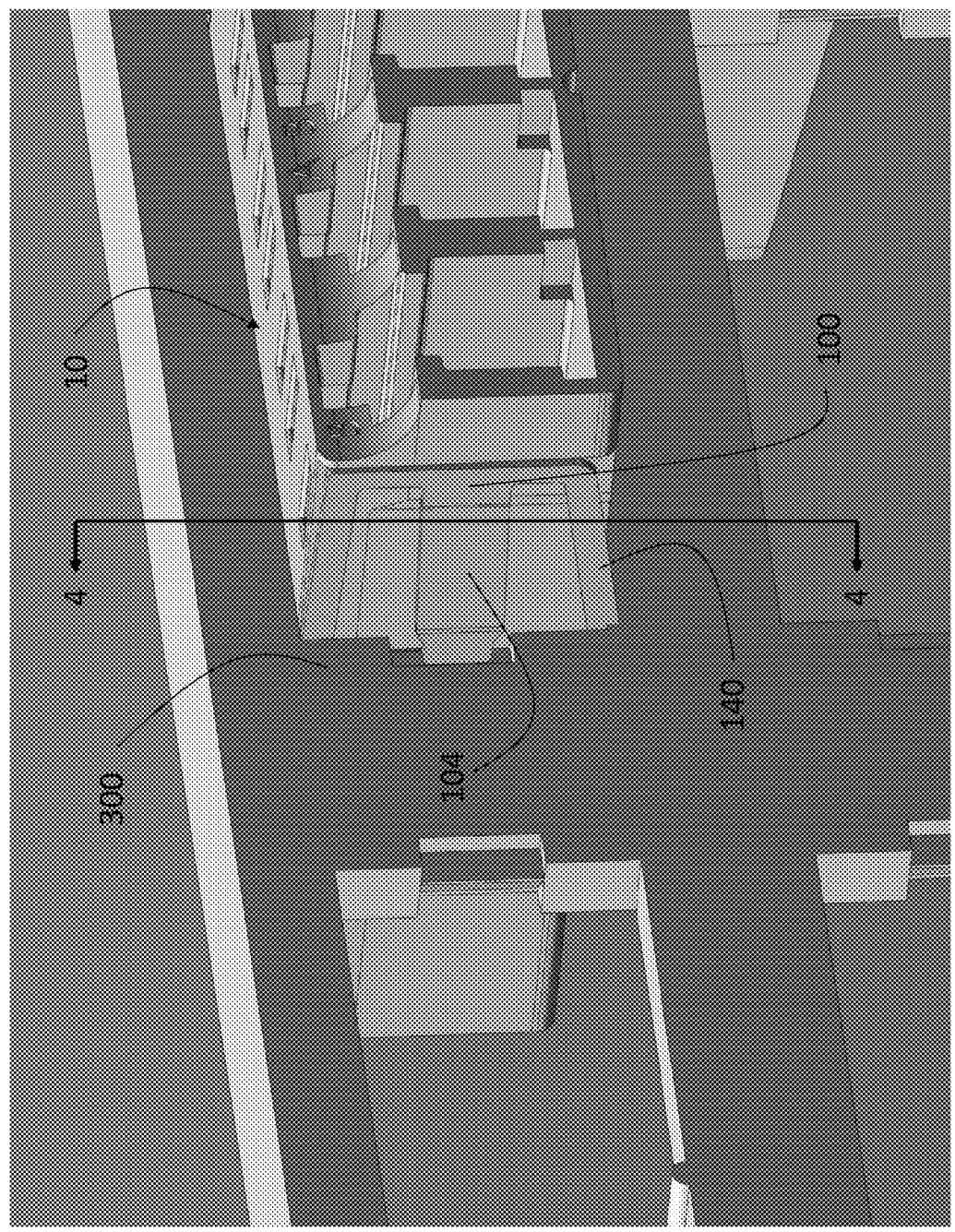
FIG. 3 is a perspective view of a telecommunications connector fitted with the mounting clip of FIG. 2 installed in a plate in an example embodiment.

FIG. 3 is a perspective view of telecommunications connector 10 fitted with the mounting clip 100 of FIG. 2 installed in a plate 300 in an example embodiment. Depicted in FIG. 3 is the mounting arm 104 engaging a front face of plate 300. Also, the spring arm 140 contacts the edge of the plate opening.

Figure 4:
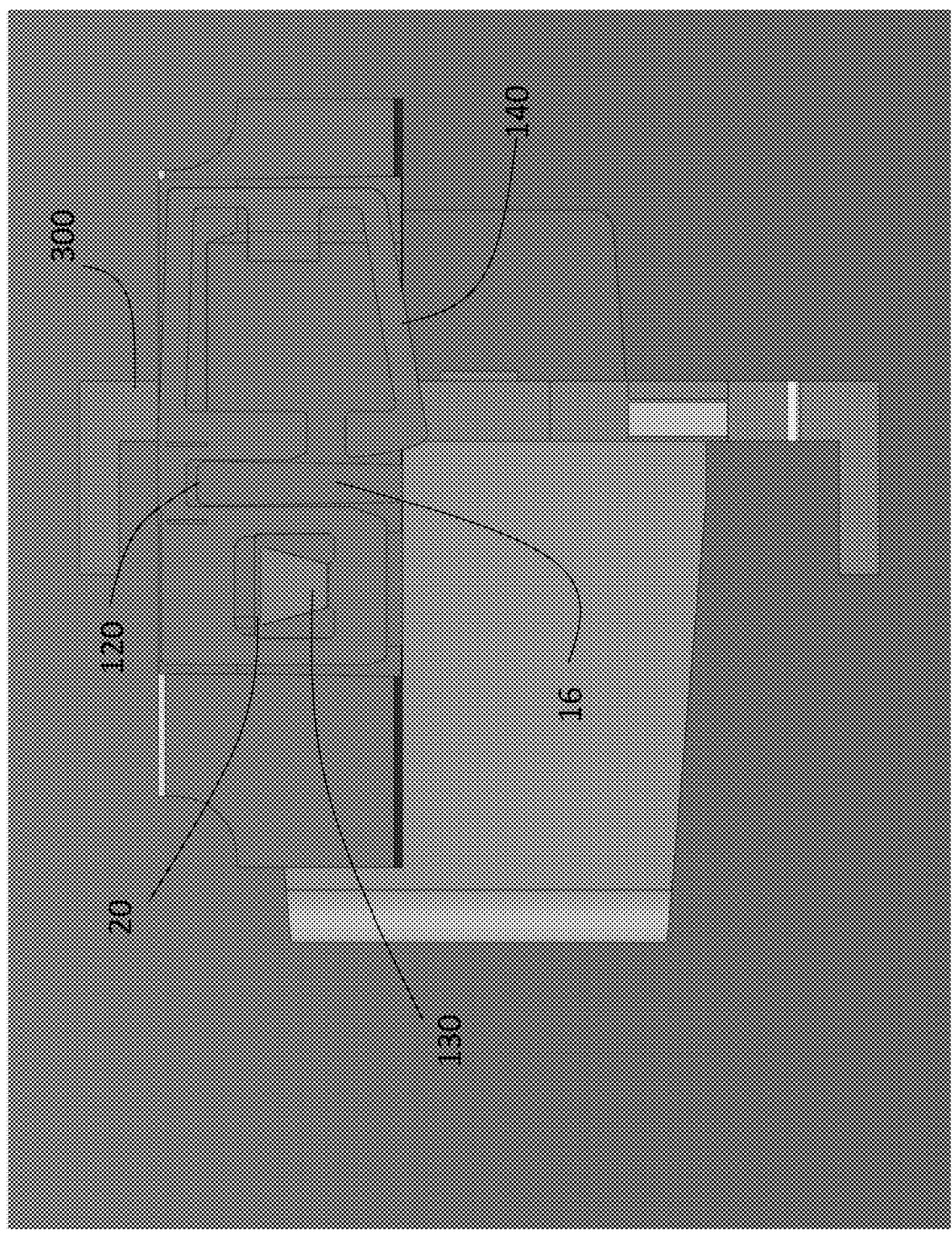
FIG. 4 is a cross-section view taken along line 4-4 of FIG. 3.

FIG. 4 is a cross-section view taken along line 4-4 of FIG. 3. Evident in FIG. 4 is the retaining clip 130 engaging undercut 20 on the telecommunications connector 10. Flange 16 is located in opening 120. Spring arm 140 contacts an edge of the opening in plate 300 to firmly secure the mounting clip 100, and telecommunications connector 10, to the plate 300.

Figure 5:
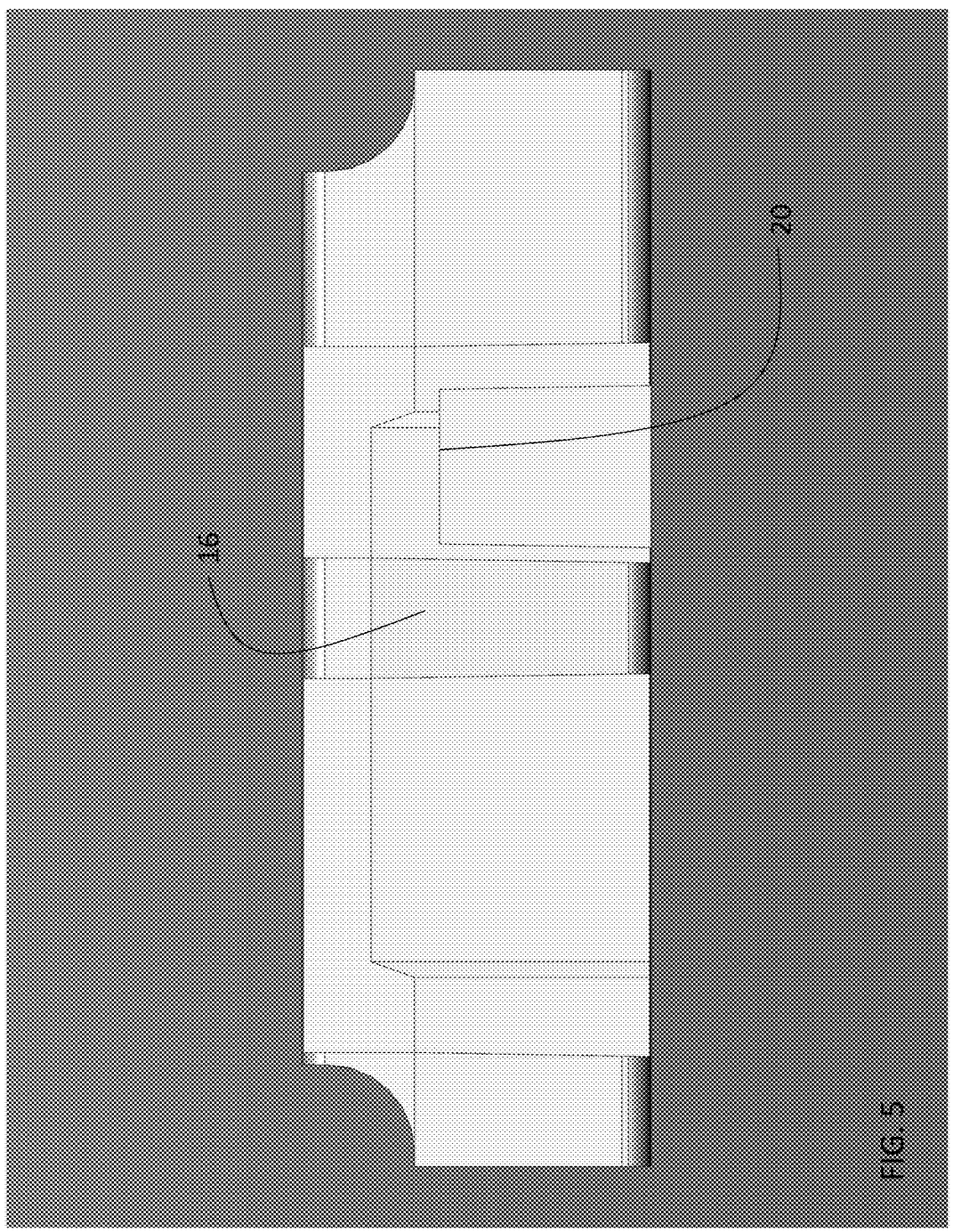
FIG. 5 is a side view of a telecommunications connector in an example embodiment.

FIG. 5 is a side view of the telecommunications connector 10 in an example embodiment. Depicted in FIG. 5 is the undercut 20 which engages retaining clip 130. Also shown in FIG. 5 is the flange 16 that is received in opening 120 of the mounting clip 100.

Figure 6:
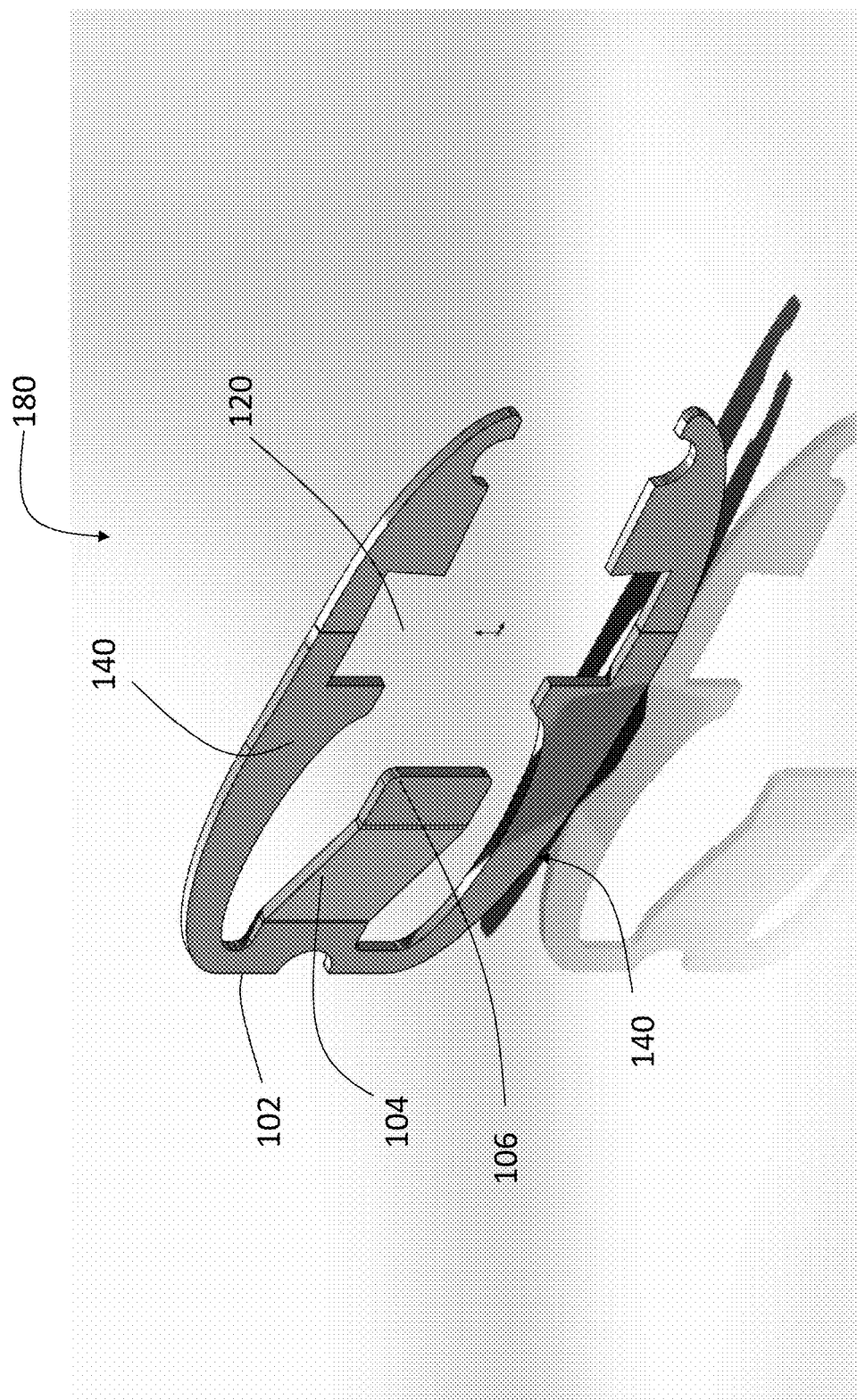
FIG. 6 is a perspective view of a mounting clip in an example embodiment.

FIG. 6 is a perspective view of a mounting clip 180 in an example embodiment. Mounting clip 180 is similar to mounting clip 100 and includes the mounting arm 104. Opening 120 engages a flange or other surface feature on a telecommunications connector. The mounting clip 180 includes spring member 140 which contacts an edge of the opening in the plate 300 to compress the mounting clip 180 in the plate opening.

Figure 7:
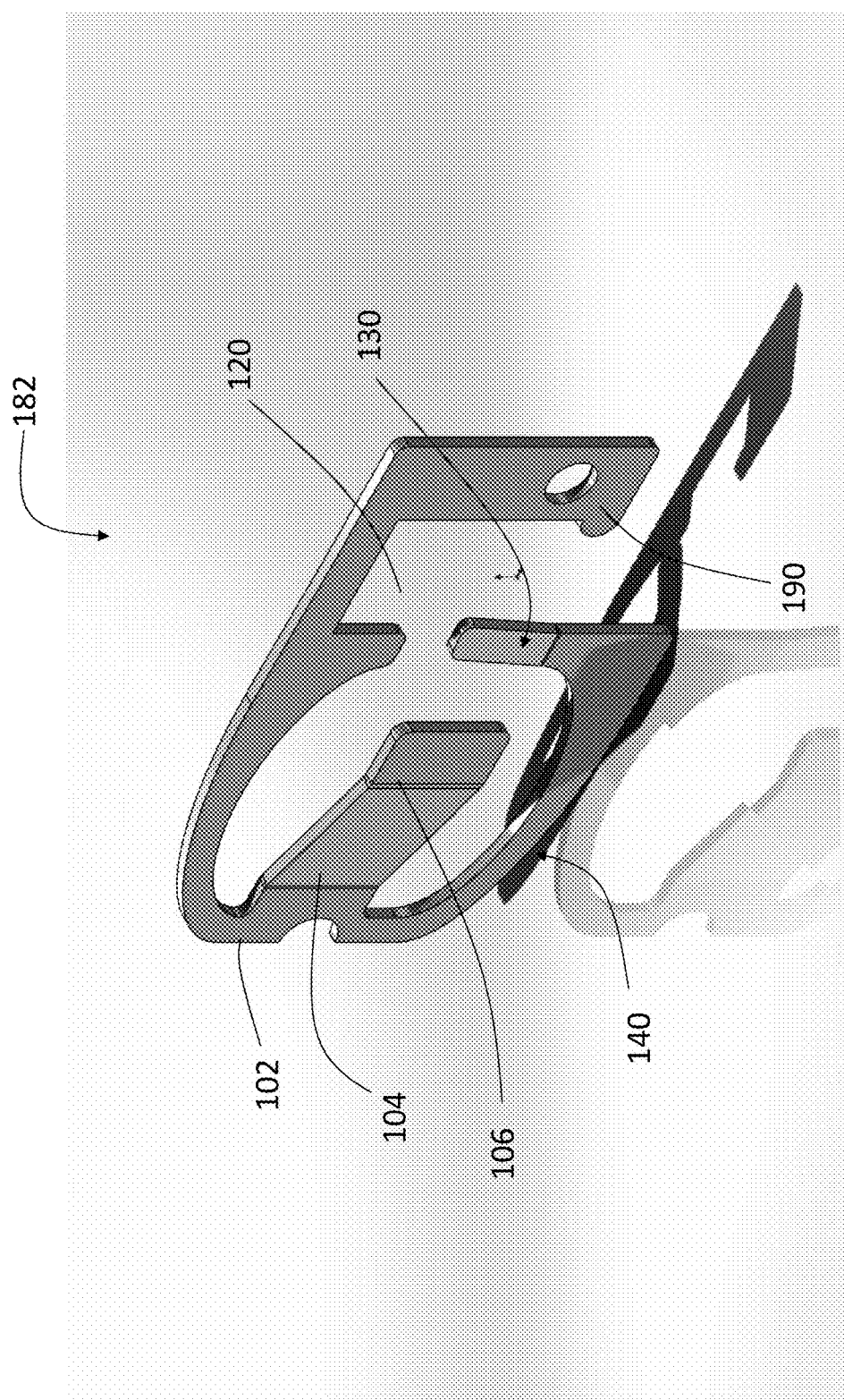
FIG. 7 is a perspective view of a mounting clip in an example embodiment.

FIG. 7 is a perspective view of a mounting clip 182 in an example embodiment. Mounting clip 182 is similar to mounting clip 100 and includes the mounting arm 104. Opening 120 engages a flange or other surface feature on a telecommunications connector. The mounting clip 182 includes spring member 140 which contacts an edge of the opening in the plate 300 to compress the mounting clip 182 in the plate opening. Retaining clip 130 contacts a surface of the telecommunications connector to restrict motion of the mounting clip 100 relative to the telecommunications connector in an upwards, vertical direction. Mounting features 190 engage mating features on a telecommunications connector while allowing spring compression of spring arm 140.

Figure 8:
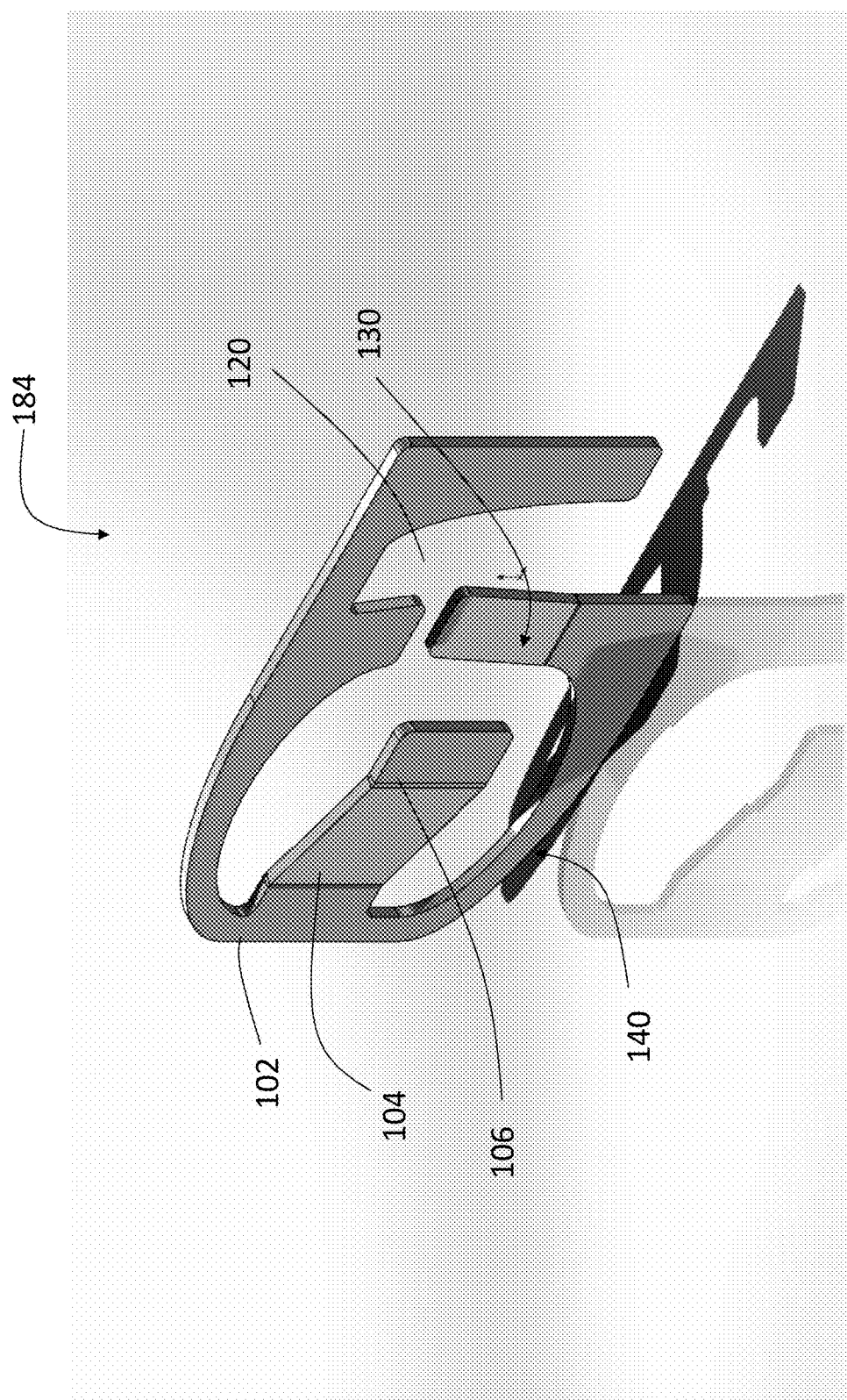
FIG. 8 is a perspective view of a mounting clip in an example embodiment.

FIG. 8 is a perspective view of a mounting clip 184 in an example embodiment. Mounting clip 184 is similar to mounting clip 100 and includes the mounting arm 104. Opening 120 engages a flange or other surface feature on a telecommunications connector. The mounting clip 184 includes spring member 140 which contacts an edge of the opening in the plate 300 to compress the mounting clip 182 in the plate opening. Retaining clip 130 contacts a surface of the telecommunications connector to restrict motion of the mounting clip 100 relative to the telecommunications connector in an upwards, vertical direction.

Figure 9:
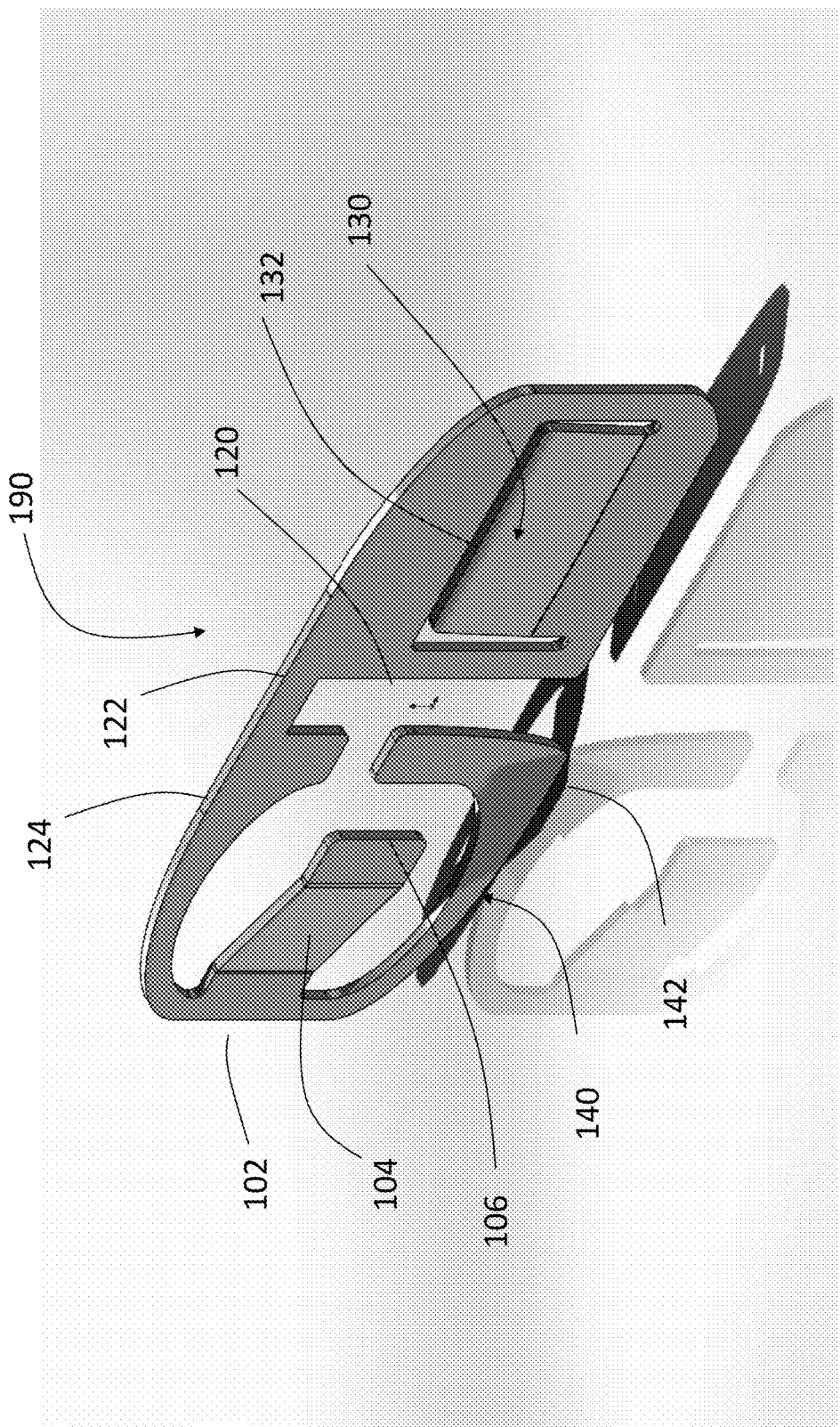
FIG. 9 is a perspective view of a mounting clip in an example embodiment.

FIG. 9 is a perspective view of a mounting clip 190 in an example embodiment. Mounting clip 190 is similar to mounting clip 100 in FIG. 2 and similar elements are labeled with similar reference numerals.

Figure 10:
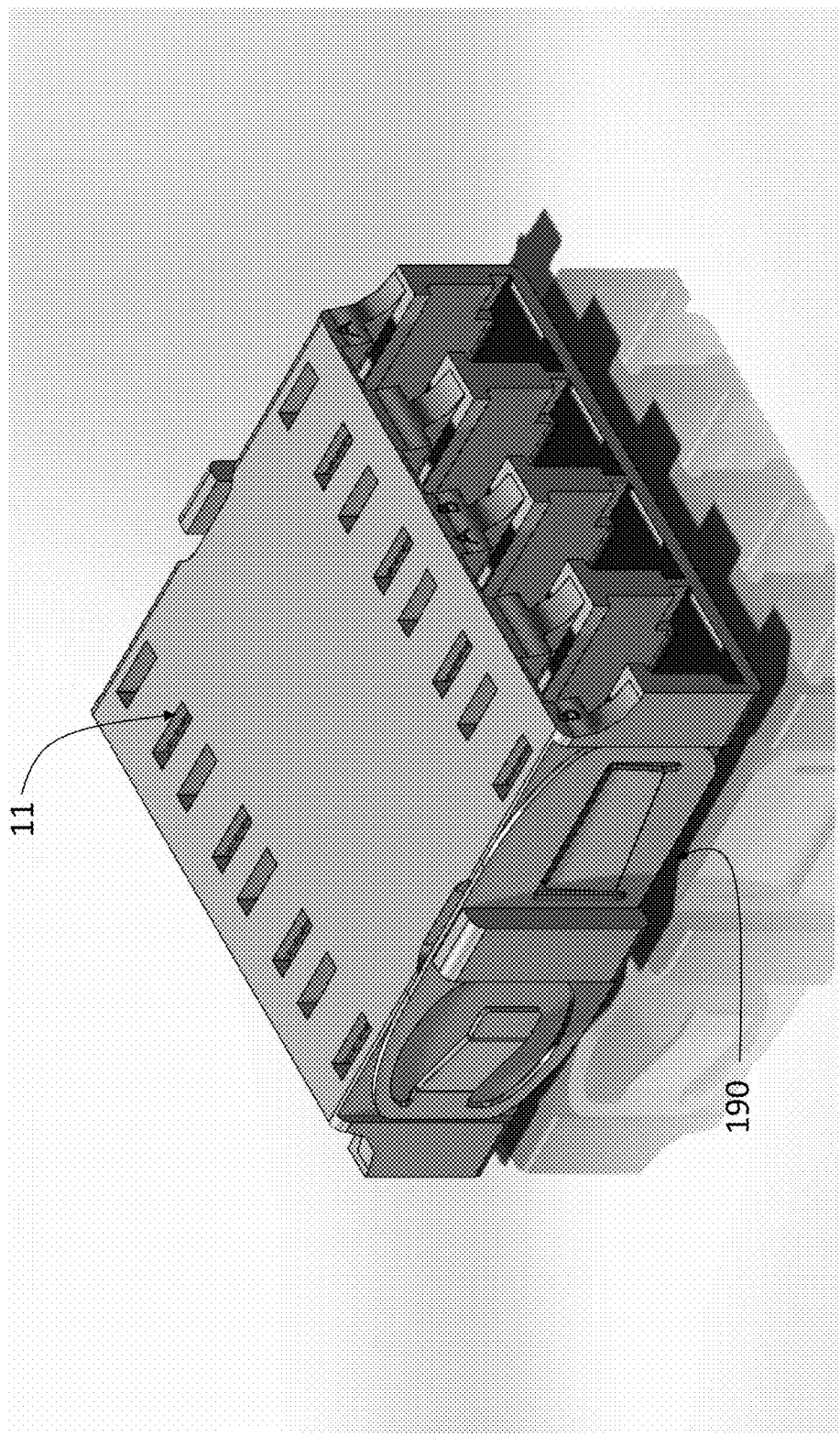
FIG. 10 is a perspective view of a four port telecommunications connector fitted with mounting clips in an example embodiment.

FIG. 10 is a perspective view of a telecommunications connector 11 fitted with mounting clip 190 in an example embodiment. The telecommunications connector 10 is a four port adapter for LC fiber connectors. It is understood that mounting clip 190 may be used with a variety of telecommunications connectors of various sizes and types, and embodiments are not limited to the telecommunications connector 11 of FIG. 10.

Figure 11:
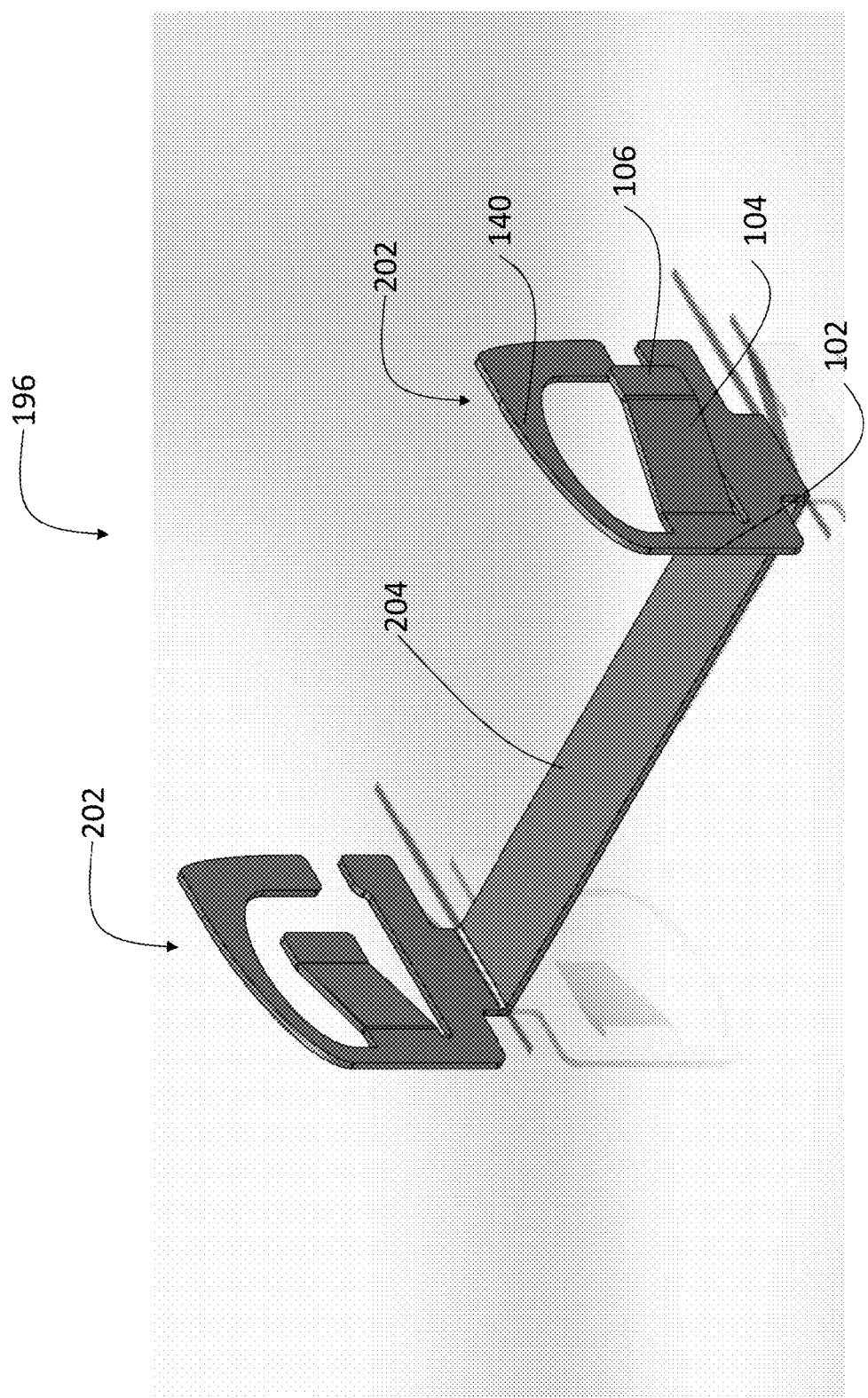
FIG. 11 is a perspective view of a one-piece mounting clip in an example embodiment.

FIG. 11 is a perspective view of a one-piece mounting assembly 196 in an example embodiment. One piece mounting assembly 196 includes two mounting clips 202 joined by a mounting bar 204. The mounting clips 202 are similar to mounting clip 100 in FIG. 2 and similar elements are labeled with similar reference numerals. The mounting assembly 196 includes a mounting bar 204 to connect the mounting clips 202 to a telecommunications connector. The mounting clips 202 do not require the opening 120 that is used to secure mounting clips 100 to a telecommunications connector, as the mounting bar 204 is used to secure the mounting assembly 196 to the telecommunications connector.

Figure 12:
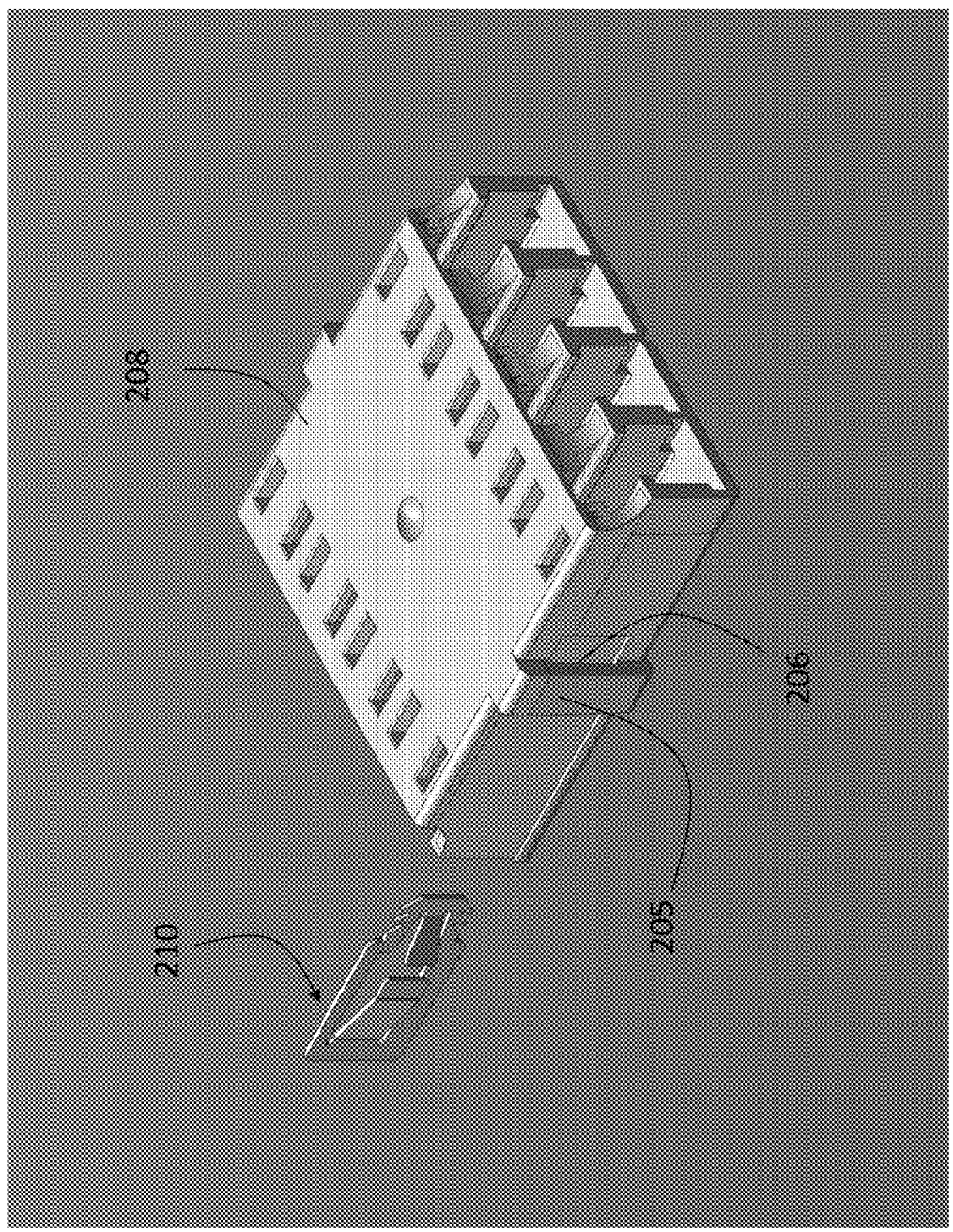
FIG. 12 is a perspective, exploded view of a mounting clip and a four port telecommunications connector in an example embodiment.
Figure 13:
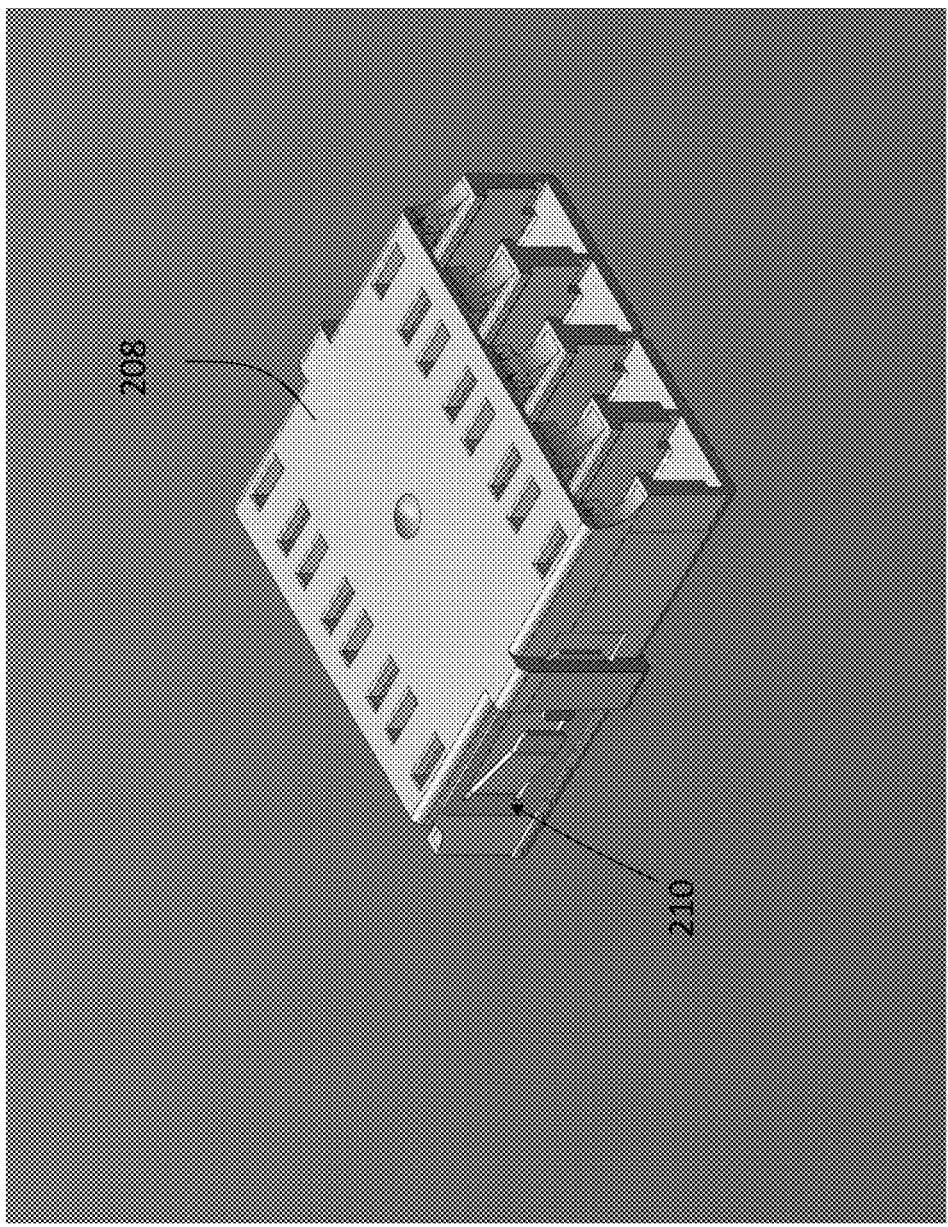
FIG. 13 is a perspective view of a four port telecommunications connector fitted with mounting clips in an example embodiment.

FIG. 12 is a perspective, exploded view of a mounting clip 210 and a telecommunications connector 208 in an example embodiment. The telecommunications connector 208 is a four port adapter for LC fiber connectors. It is understood that the mounting clips 210 may be used with a variety of telecommunications connectors of various sizes and types, and embodiments are not limited to the telecommunications connector 208 of FIG. 12. The side walls of telecommunications connector 208 include a pocket 206 into which a tail of mounting clip 210 is inserted to secure the mounting clip 210 to the telecommunications connector 208. FIG. 13 is a perspective view of mounting clip 210 secured to the telecommunications connector 208.

Figure 14:
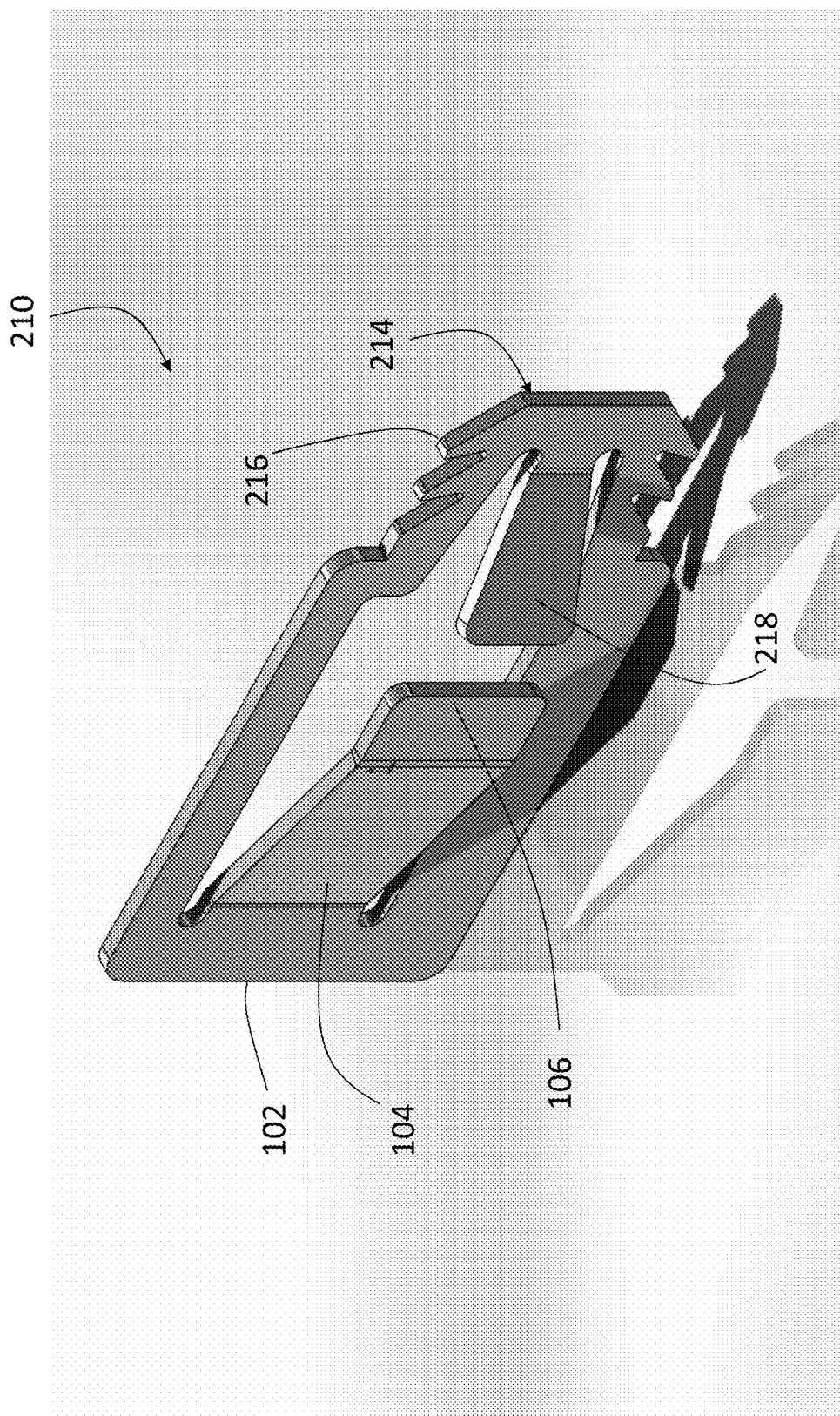
FIG. 14 is a perspective view of a mounting clip in an example embodiment.

FIG. 14 is a perspective view of the mounting clip 210. Mounting clip 210 includes a generally planar body having a mounting arm 104 that extends rearward from a front edge 102 of the mounting clip 210. The mounting arm 104 extends away from the plane of the mounting clip 210 at an acute angle. The mounting arm 104 has a distal end 106 configured to contact a front face of a plate 300 (FIG. 3) to prevent horizontal travel of the telecommunications connector 208 inwards, towards the plate. Mounting clip 210 also includes a tail portion 214 that is received in pocket 206 of flange 205. Tail section may include serrations 216 that provide a friction fit inside pocket 206. Tail section 214 also includes a spring arm 218 that applies a spring force against the edge of the opening in plate 300. The spring arm 140 of mounting clip 100 of FIG. 2 applies a spring force against the plate in a vertical direction. By contrast, spring arm 218 applies a spring force in a horizontal direction. Spring arm 218 prevents rattle of the telecommunications connector 208 in the plate opening.

Figure 15:
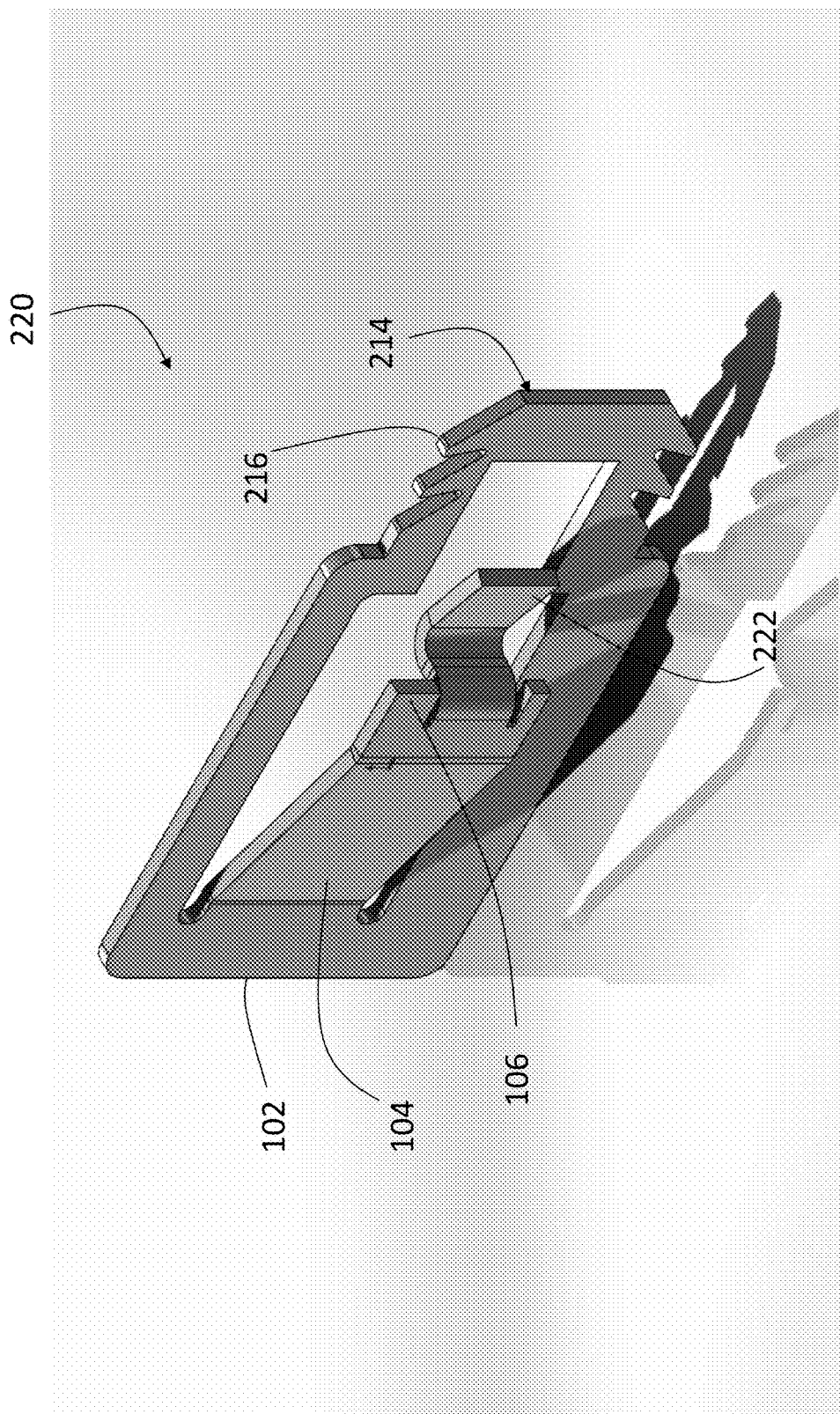
FIG. 15 is a perspective view of a mounting clip in an example embodiment.

FIG. 15 is a perspective view of a mounting clip 220 for use with telecommunications connector 208 in an example embodiment. Mounting clip 220 includes a generally planar body having a mounting arm 104 that extends rearward from a front edge 102 of the mounting clip 220. The mounting arm 104 extends away from the plane of the mounting clip 220 at an acute angle. The mounting arm 104 has a distal end 106 configured to contact a front face of a plate 300 (FIG. 3) to prevent horizontal travel of the telecommunications connector 208 inwards, towards the plate 300. Mounting clip 220 also includes a tail portion 214 that is received in pocket 206 of flange 205. Tail section may include serrations 216 that provide a friction fit inside pocket 206. A spring arm 222 is formed as an extension from the distal end 106 of the mounting arm 104. Spring arm 222 applies a spring force against the edge of the opening in a plate. Similar to spring arm 218, spring arm 222 applies a spring force in a horizontal direction. Spring arm 222 prevents rattle of the telecommunications connector 208 in the plate opening.

Figure 16:
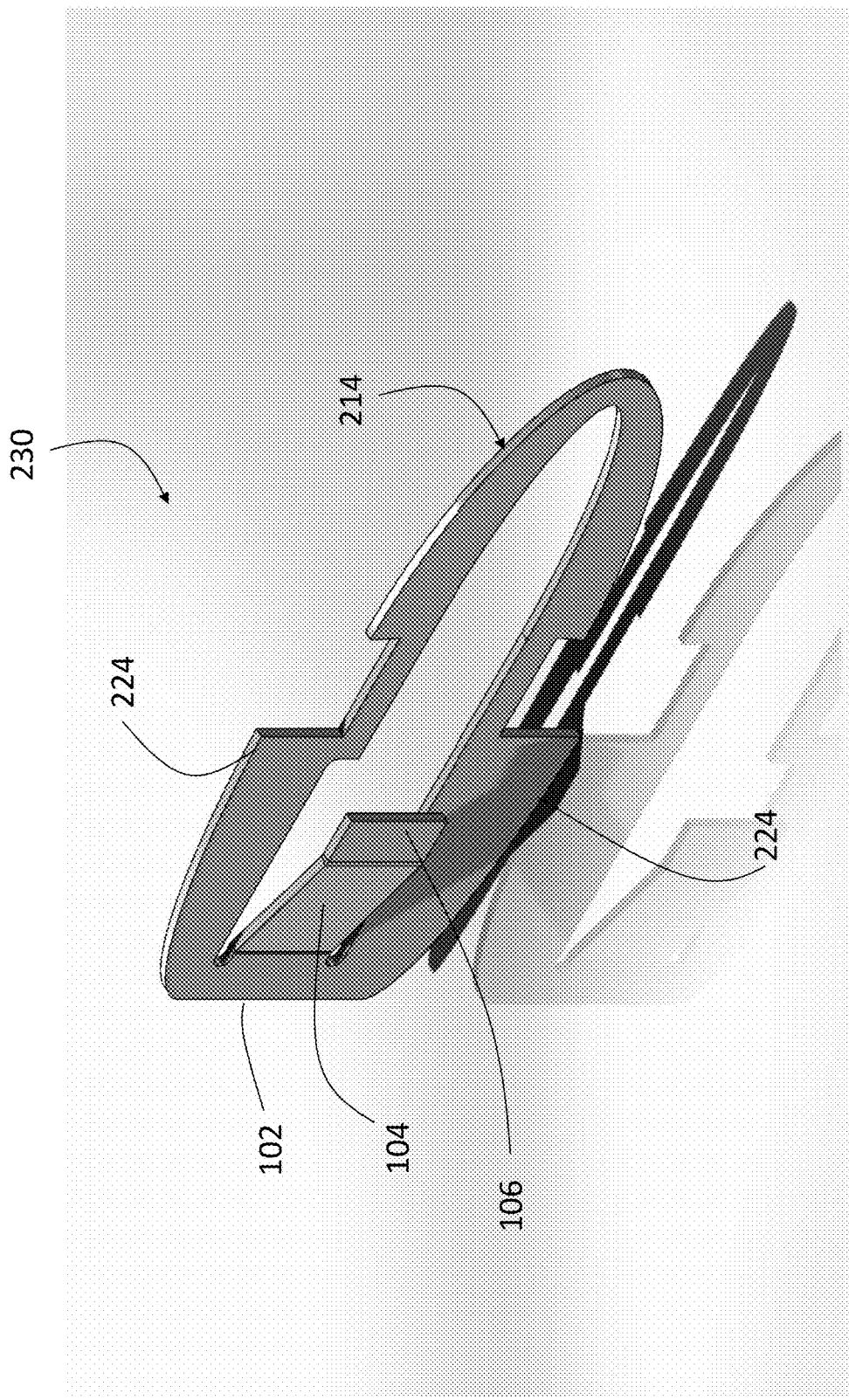
FIG. 16 is a perspective view of a mounting clip in an example embodiment.

FIG. 16 is a perspective view of a mounting clip 230 for use with telecommunications connector 208 in an example embodiment. Mounting clip 230 includes a generally planar body having a mounting arm 104 that extends rearward from a front edge 102 of the mounting clip 230. The mounting arm 104 extends away from the plane of the mounting clip 230 at an acute angle. The mounting arm 104 has a distal end 106 configured to contact a front face of a plate 300 (FIG. 3) to prevent horizontal travel of the telecommunications connector 208 inwards, towards the plate 300. Mounting clip 230 also includes a tail portion 214 that is received in pocket 206 of flange 205. Spring arms 224 apply spring force against the edge of the opening in a plate. Similar to spring arm 140, spring arms 224 applies a spring force in a vertical direction. Spring arms 224 prevent rattle of the telecommunications connector 208 in the plate opening.

Figure 17:
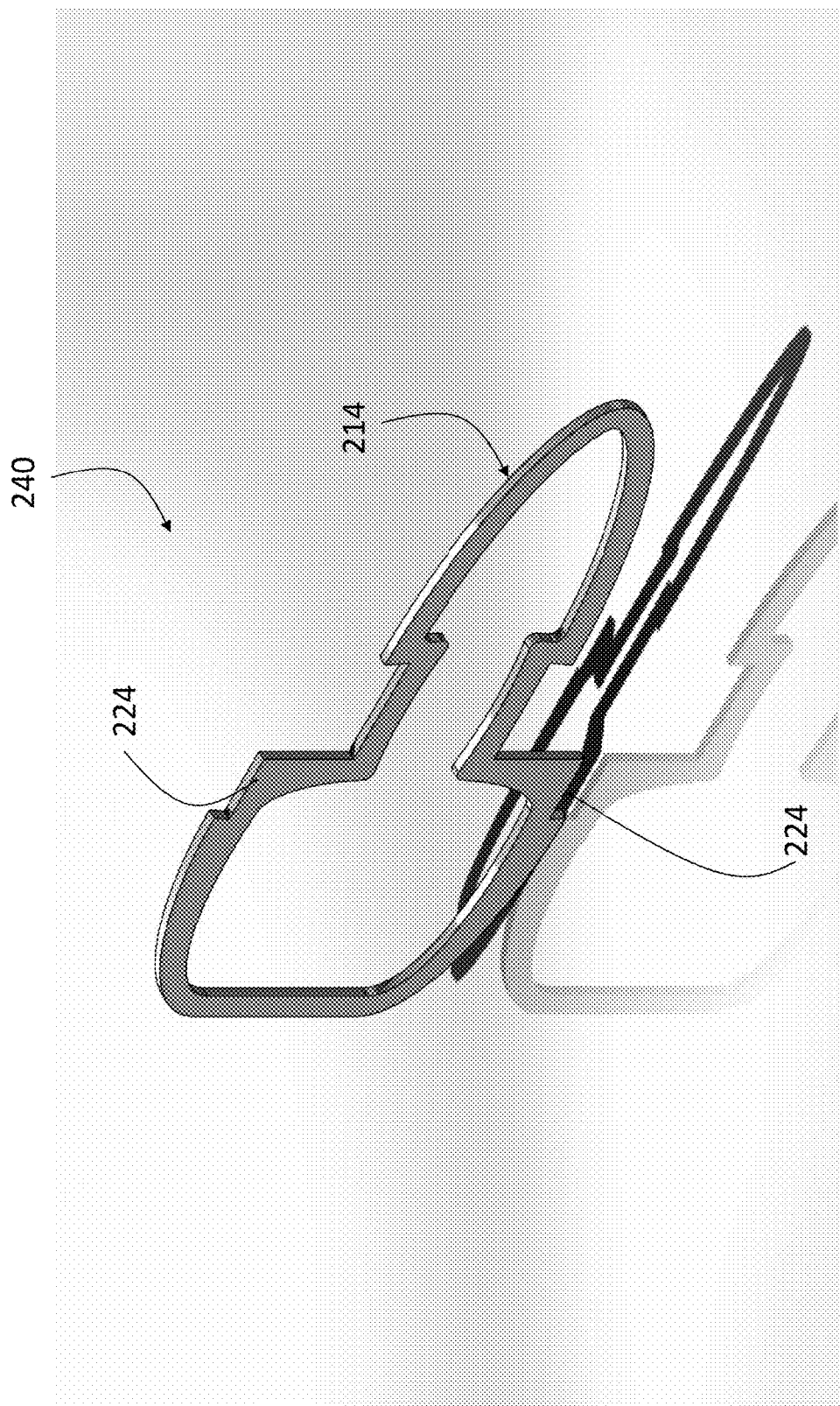
FIG. 17 is a perspective view of a mounting clip in an example embodiment.

FIG. 17 is a perspective view of a mounting clip 240 for use with telecommunications connector 208 in an example embodiment. Mounting clip 240 is used to prevent movement or rattle of the telecommunications connector 208 within the opening in plate 300. Mounting clip 240 also includes a tail portion 214 that is received in pocket 206 of flange 205. Spring arms 224 apply a spring force against the edge of the opening in plate 300. Similar to spring arm 140, spring arms 224 apply spring force in a vertical direction. Spring arms 224 prevent rattle of the telecommunications connector 208 in the plate opening.

Figure 18:
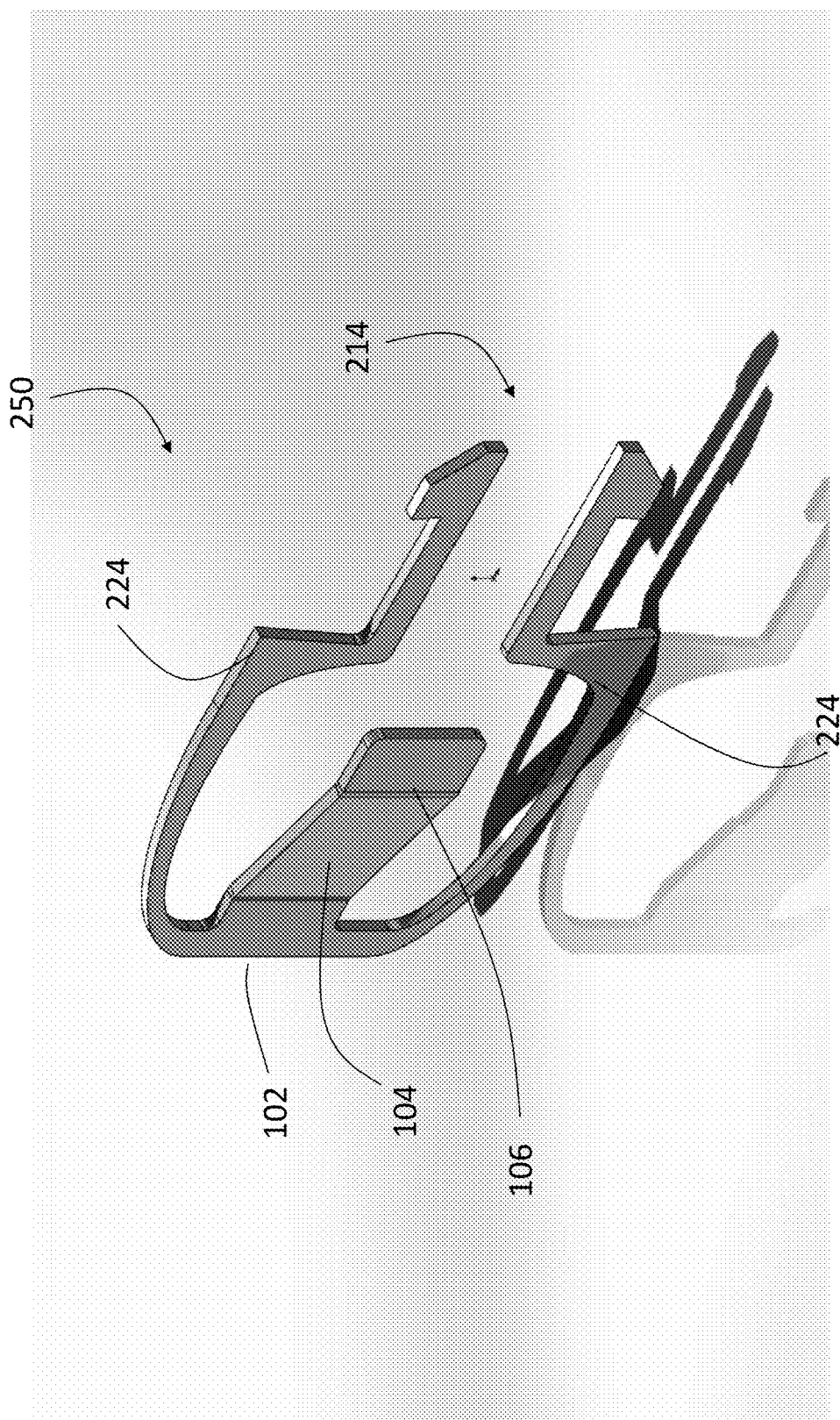
FIG. 18 is a perspective view of a mounting clip in an example embodiment.

FIG. 18 is a perspective view of a mounting clip 250 for use with telecommunications connector 208 in an example embodiment. Mounting clip 250 includes a generally planar body having a mounting arm 104 that extends rearward from a front edge 102 of the mounting clip 250. The mounting arm 104 extends away from the plane of the mounting clip 250 at an acute angle. The mounting arm 104 has a distal end 106 configured to contact a front face of a plate 300 (FIG. 2) to prevent horizontal travel of the telecommunications connector 208 inwards, towards the plate. Mounting clip 230 also includes a tail portion 214 that is received in pocket 206 of flange 205. Spring arms 224 apply spring force against the edge of the opening in a plate. Similar to spring arm 140, spring arms 224 applies a spring force in a vertical direction. Spring arms 224 prevent rattle of the telecommunications connector 208 in the plate opening.

Embodiments provide a number of advantages over existing mounting clips. Certain advantages are described below.

UNIVERSAL COMPATIBILITY—Embodiments are not width dependent. Because each side of the clip is a single piece and not connected like a traditional LC latch, the same clip can be used with simplex, duplex and quad telecommunications connectors, or even wider telecommunications connectors with more than 4 LC ports, without requiring additional tooling.

MORE RELIABLE AND SECURE—The mounting clip biases the telecommunications connector body against the plate. This anti-rattle feature (prevents looseness of telecommunications connector) is not dependent on thickness of plate opening. The anti-rattle feature will work with a wider range of plate openings.

AESTHETICS—no big metal beam across the top of the telecommunications connector.

COST BENEFITS—Less metal material required. Less waste metal.

MANUFACTURING BENEFITS—AUTOMATION—Embodiments allow simplified automation. Mounting clips install from above with a simple insertion into telecommunications connector body. The symmetrical mounting clip design simplifies assembly. Left and right mounting clips may be formed just prior to final assembly.

MANUFACTURING BENEFITS—STAMPING—Simplified stamping in that no additional bending is required after the telecommunications connector retention feature is formed. Flat mounting clip design is better for transport by reel, more parts per reel. Anti-rattle features works with a wider range of (clip) material tempers. Telecommunications connector retention occurs on a separate plane (90°) from anti-rattle feature which allows for easier modification of both the retention feature and/or the anti-rattle feature.

MOLDING BENEFITS—Top and bottom surfaces of telecommunications connector body are not utilized by mounting clip, leaving room for gating options or logos. Better moldability of telecommunications connector body as there are no thin areas across bottom due to the mounting clip straddling bottom of the telecommunications connector body.

The terminology used herein is for the purpose of describing particular embodiments only and is not intended to be limiting of the invention. While the description of the present invention has been presented for purposes of illustration and description, it is not intended to be exhaustive or limited to the invention in the form disclosed. Many modifications, variations, alterations, substitutions, or equivalent arrangement not hereto described will be apparent to those of ordinary skill in the art without departing from the scope and spirit of the invention. Additionally, while the various embodiments of the invention have been described, it is to be understood that aspects of the invention may include only some of the described embodiments. Accordingly, the invention is not to be seen as being limited by the foregoing description.

What is claimed is:

1. A mounting clip configured to secure a telecommunications connector in an opening of a plate, the telecommunications connector having a top, bottom and two sides, the mounting clip comprising:
 a planar body having a portion configured to engage one side of the telecommunications connector;
 at least one spring arm configured to contact the plate and apply a spring force against the plate to reduce movement of the mounting clip in the opening;
 a mounting arm extending rearward from a front edge of the mounting clip, the mounting arm including a distal end configured to contact a front face of the plate, the mounting arm being distinct from the at least one spring arm, the mounting arm extending away from the planar body at an acute angle;
 wherein the spring force is in a vertical direction.

2. The mounting clip of claim 1 further comprising:
 a retaining clip configured to contact a surface of the telecommunications connector.

3. The mounting clip of claim 1 further comprising:
an opening configured to receive a flange of the telecommunications connector.

4. The mounting clip of claim 1 further comprising:
a tail configured to engage a pocket of the telecommunications connector.

5. The mounting clip of claim 1 further comprising:
a retaining clip configured to contact a surface of the telecommunications connector to restrict motion of the mounting clip relative to the telecommunications connector.

6. A mounting clip configured to secure a telecommunications connector in an opening of a plate, the telecommunications connector having a top, bottom and two sides, the mounting clip comprising:
  a planar body having a portion configured to engage one side of the telecommunications connector;
  at least one spring arm configured to contact the plate and apply a spring force against the plate to reduce movement of the mounting clip in the opening;
  a tail configured to engage a pocket of the telecommunications connector
  wherein the tail includes serrations.

* * * * *